Dec. 22, 1953 D. F. ILLIAN ET AL 2,663,786
TIMER APPARATUS
Filed Oct. 14, 1952 3 Sheets-Sheet 1
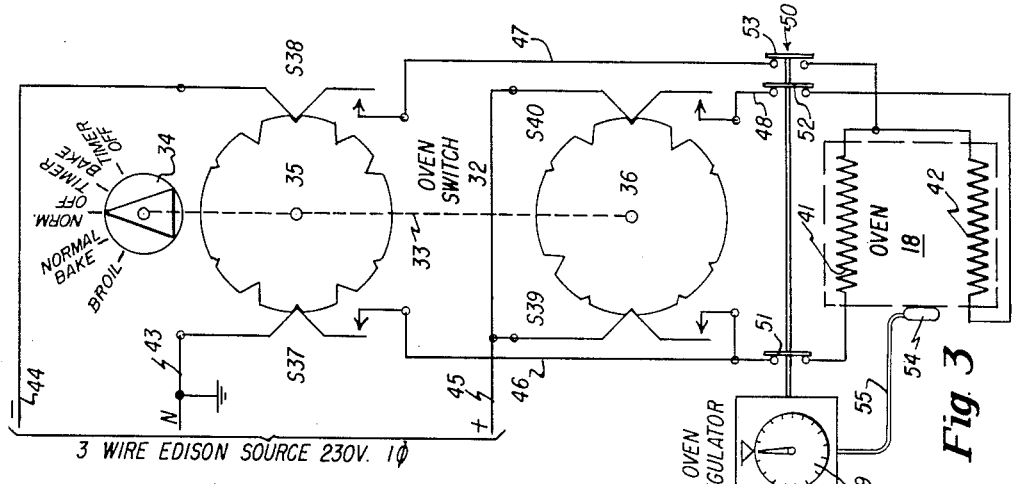
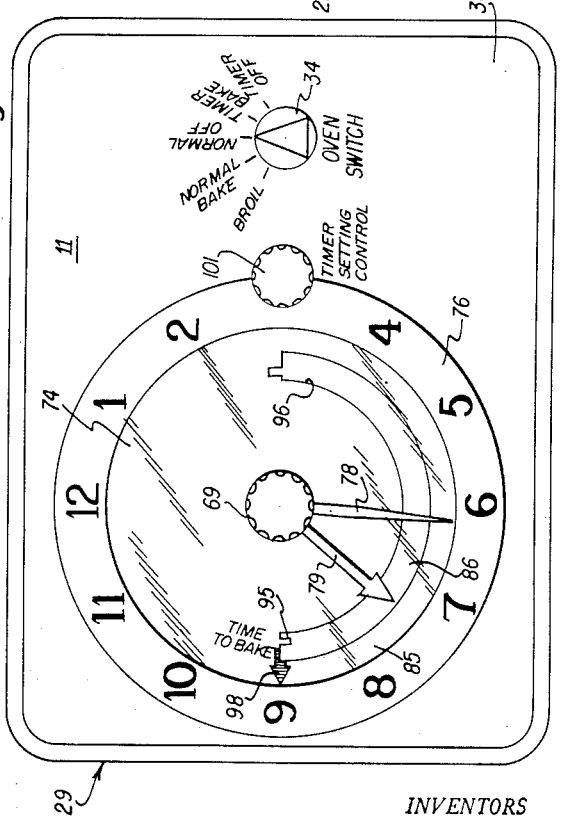
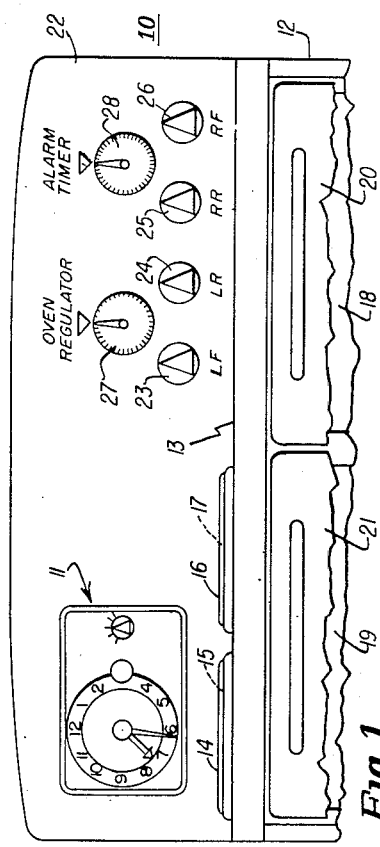
INVENTORS
Douglas F. Illian
Norman T. Terp
BY
Smith, Olsen + Baird
Attys.

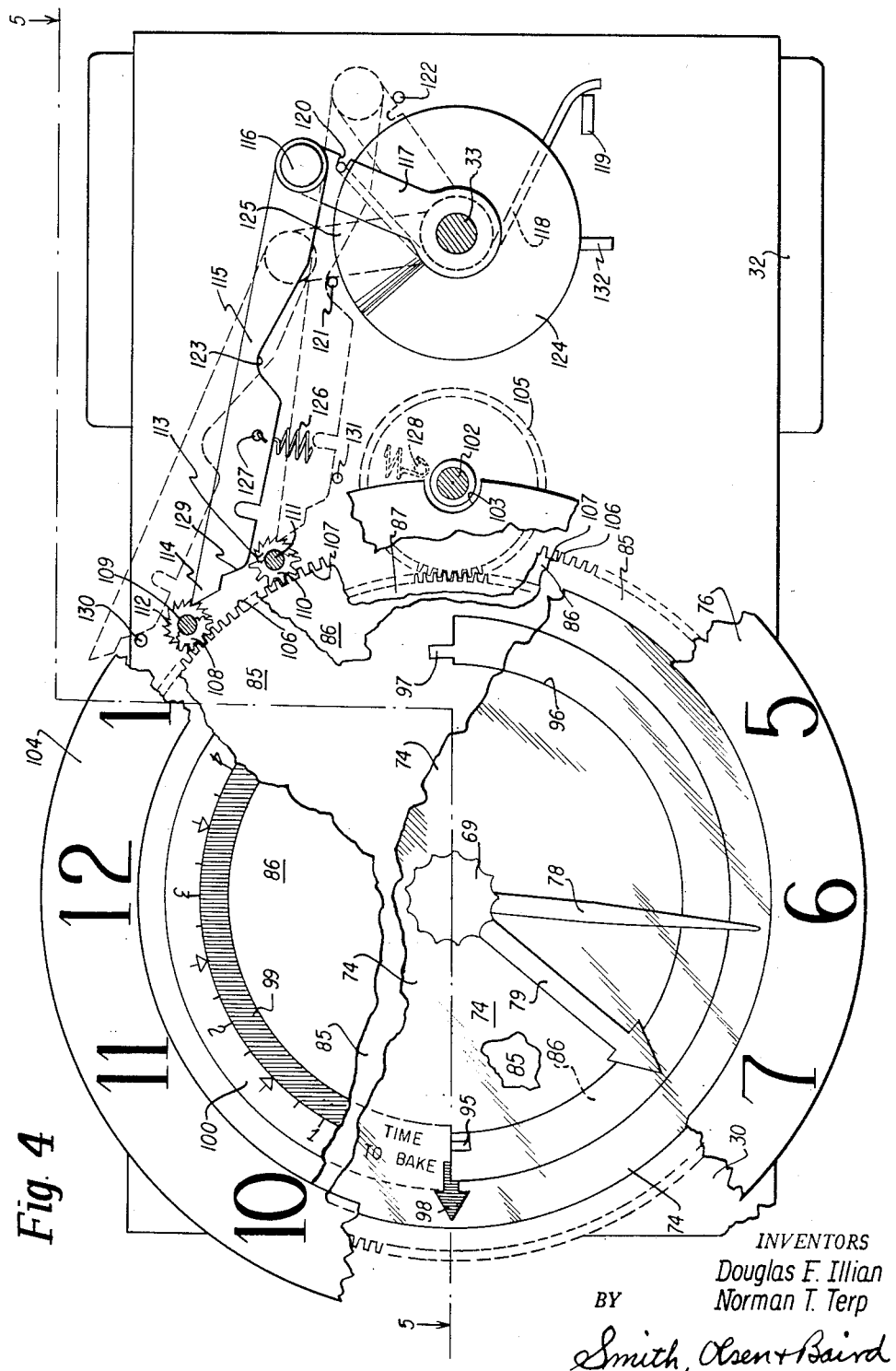

Dec. 22, 1953    D. F. ILLIAN ET AL    2,663,786
TIMER APPARATUS

Filed Oct. 14, 1952    3 Sheets-Sheet 3

INVENTORS
Douglas F. Illian
Norman T. Terp
BY
Smith, Olsen + Baird
Attys.

Patented Dec. 22, 1953

2,663,786

UNITED STATES PATENT OFFICE 2,663,786

TIMER APPARATUS

Douglas F. Illian, Oak Park, and Norman T. Terp, Chicago, Ill., assignors to General Electric Company, a corporation of New York Application October 14, 1952, Serial No. 314,674

22 Claims. (Cl. 219—20)

1

The present invention relates to timer apparatus, and more particularly to clock-controlled switching equipment for selectively governing the electric heating system of an oven, or the like.

An electric range ordinarily comprises an oven provided with timer apparatus for selectively closing and opening the heating circuit thereof respectively at set start and stop clock times so that an automatic cooking operation may be carried out in the oven under the control of the timer apparatus after setting thereof. This timer apparatus conventionally comprises a manually operable master control lever that is selectively operable into "on," "off" and "manual" positions, as well as at least one manually operable knob for selectively setting the start clock time and the stop clock time. Further, the heating circuit normally comprises a manually operable selector switch having "broil," "off," "manual bake" and "time bake" positions, as well as a manually settable oven temperature regulator. Now all of these devices must be properly controlled and set in order to condition the heating circuit for an automatic cooking operation in the oven; and further, the operator must remember to disable the timer apparatus after an automatic cooking operation in order to restore the heating circuit to manual control. Specifically, after an automatic cooking operation, the operator must operate the master control lever of the timer apparatus from its "off" position back into its "manual" position in order that the selector switch in its "manual bake" position may govern the heating circuit on a manual basis, since the timer apparatus incorporates switch contacts that are arranged in series circuit relationship with the manually operable selector switch. Needless to say, all of this manipulation of the knobs and levers in order to shift between manual control and automatic control of the cooking operations in the oven of the electric range is confusing to an operator and leads to many unnecessary service calls.

Accordingly, it is a general object of the present invention to provide an electric heating system for an oven, or the like, that incorporates a minimum number of manually operable devices and that accommodates both manual control and automatic control of the various cooking operations which may be carried out in the oven.

Another object of the invention is to provide in combination manual-controlled and clock-controlled switching apparatus, a manually operable member selectively operative into a plurality of control positions positively to operate the associated switching mechanism into its respective and corresponding control positions, regardless of the set or unset position of the associated timer mechanism, whereby the control position of the member overrides the control position of the timer mechanism with respect to the actual control of the switching mechanism.

Another object of the invention is to provide in combination manual-controlled and clock-controlled switching apparatus, an improved and simple arrangement governed by initial manual control of the switching mechanism for placing subsequent automatic control thereof under the timer mechanism.

Another object of the invention is to provide timer apparatus of improved construction and arrangement so that it may serve both as an attractive kitchen clock and as a simple controller for a selector switch that is also manually operable and that is incorporated in an associated heating circuit.

A further object of the invention is to provide timer apparatus incorporating an improved arrangement of the start dial and the stop dial thereof, so as to accommodate ready setting of corresponding start and stop clock times and corresponding direct indications of the set start and stop clock times with reference to the normal clock time indicia thereof.

A further object of the invention is to provide timer apparatus incorporating an improved arrangement including a single manually operable control member for selectively setting sequentially the stop dial and the start dial incorporated therein so that the timer may be used either only for stopping at a set stop clock time a manually started cooking operation, or both for starting a cooking operation at a set start clock time and later for stopping the cooking operation at a set stop clock time.

Further features of the invention pertain to the particular arrangement of the elements of the timer apparatus and the heating system, whereby the above-outlined and additional operating features thereof are attained.

The invention, both as to its organization and method of operation, together with further objects and advantages thereof, will best be understood by reference to the following specifications taken in connection with the accompanying drawings, in which Figure 1 is a fragmentary front elevational view of the upper portion of an electric range provided with a heating system including timer apparatus and embodying the present invention;

Fig. 2 is an enlarged front elevational view of the timer apparatus that is supported in the backsplash of the electric range;

Fig. 3 is a diagrammatic illustration of the electric heating system of the oven incorporated in the electric range;

Fig. 4 is a further enlarged fragmentary front elevational view, partly in section, of the timer apparatus shown in Fig. 2.

Figure 5:
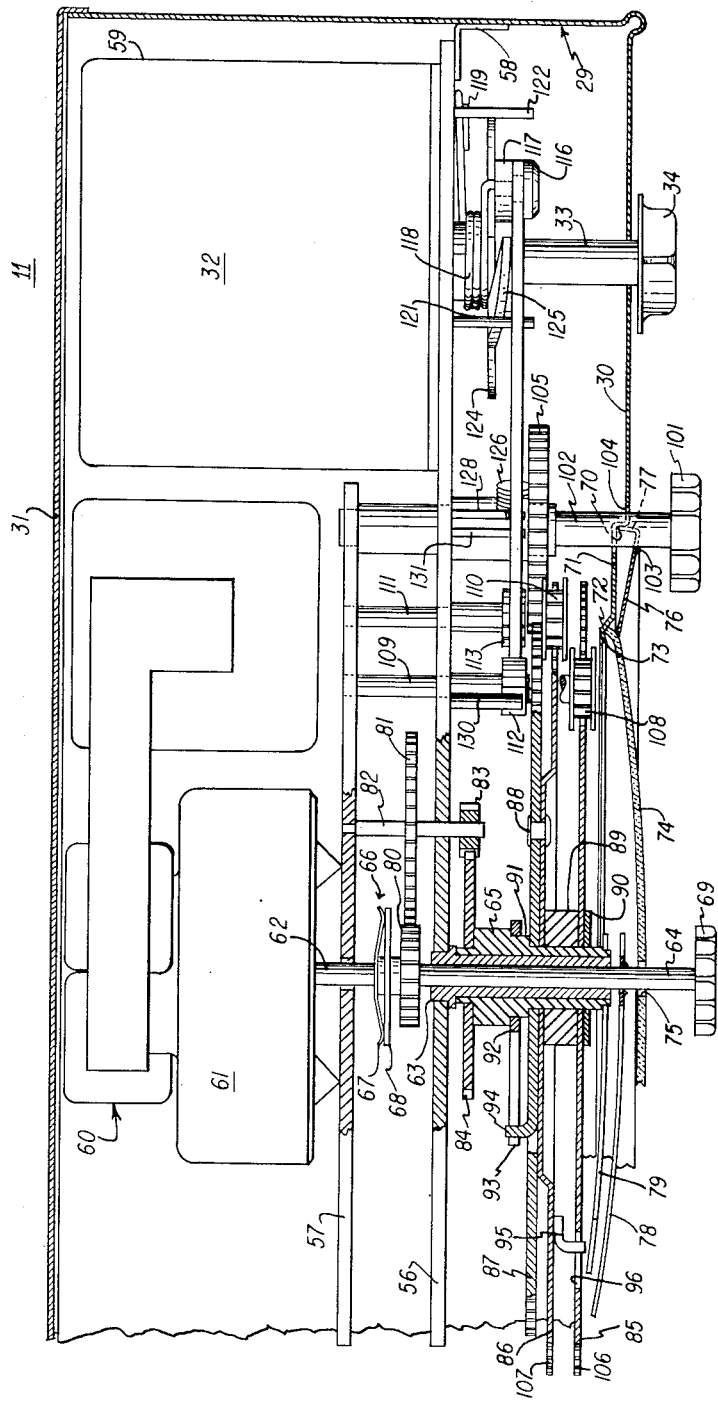
Fig. 5 is a further enlarged fragmentary horizontal sectional view of the timer apparatus, taken in the direction of the arrows, along the offset line 5—5 in Fig. 4.

Referring now to Fig. 1 of the drawings, the electric range 10 there illustrated incorporates a heating system including timer apparatus 11 and embodies the features of the present invention. More specifically, the range 10 includes an upstanding body 12 provided with a substantially horizontal cooking top 13 supporting the different surface heating units or hot plates 14, 15, 16 and 17 arranged in spaced-apart relation on the left-hand side thereof. The body 12 houses an oven 18 in the right-hand portion thereof and a storage compartment 19 in the left-hand portion thereof, the oven 18 and the compartment 19 being accessible through respective front openings provided with respective front doors 20 and 21. The cooking top 13 carries an upstanding backsplash 22 adjacent to the rear thereof that carries four manually operable selector switches 23, 24, 25 and 26 respectively corresponding to the surface heating units 14, 15, 16 and 17, all arranged in a horizontal row on the lower right-hand portion thereof. Also, the backsplash 22 carries an oven regulator 27 and an alarm timer 28 on the upper right-hand portion thereof, the timer apparatus 11 being carried on the upper left-hand portion of the backsplash 22.

As best shown in Figs. 2 and 5, the timer apparatus 11 comprises a casing or housing 29 that may be placed directly in a corresponding opening provided in the left-hand upper portion of the backsplash 22 and secured in place by any suitable arrangement, not shown. Specifically, the casing 29 includes a substantially flat front wall 30 disposed substantially flush with the front of the backsplash 22 and a removable rear wall 31 readily accessible from the rear of the backsplash 22; and the casing 29 houses a manually operable oven selector switch 32 of the rotary snap type and provided with a rotatable operating shaft 33 projecting forwardly through a cooperating hole formed in the front wall 30 and carrying on the extreme outer end thereof an operating knob 34 that cooperates with suitable indicia provided in arcuate array on the adjacent portion of the front wall 30. Specifically, as illustrated in Figs. 2 and 3, the oven selector switch 32 comprises a "normal off" position, an adjacent "normal bake" position and an adjacent "timer bake" position, as well as a "broil" position disposed adjacent to the "normal bake" position and a "timer off" position disposed adjacent to the "timer bake" position; the "normal bake" and the "broil" positions being disposed on the left-hand side of the "normal off" position, and the "timer bake" and the "timer off" positions being disposed on the right-hand side of the "normal off" position.

The oven selector switch 32 may be of any conventional construction and comprises, as illustrated in Fig. 3, two insulating cams 35 and 36 carried on the inner end of the operating shaft 33 and provided with respectively cooperating pairs of switch springs S37, S38 and S39, S40. Also, as illustrated in Fig. 3, the oven 18 is provided with upper and lower heating elements 41 and 42 of any suitable type and an associated three-wire Edison source of 230 volts, single phase, the source of current supply including a grounded neutral conductor 43 and two ungrounded outside conductors 44 and 45. The neutral conductor 43 and the outside conductor 44 are respectively connected to the movable springs of the sets of switch springs S37 and S38; while the outside conductor 45 is commonly connected to the movable springs of the sets of switch springs S39 and S40. The stationary springs of the sets of switch springs S37 and S38 are respectively connected to two conductors 46 and 47; the stationary spring of the set of switch springs S39 is also connected to the conductor 46; and the stationary spring of the set of switch springs S40 is connected to a conductor 48. The oven regulator 27 comprises a manually settable temperature dial 49, as well as a control switch 50 that includes three bridging members 51, 52 and 53. The bridging member 51 is provided with an associated pair of contacts, one of the contacts terminating the conductor 46 and the other of the contacts terminating one terminal of the heating element 41. The bridging member 52 is provided with an associated pair of contacts, one of the contacts terminating the conductor 48 and the other of the contacts terminating one terminal of the heating element 42. The bridging member 53 is provided with an associated pair of contacts, one of the contacts terminating the conductor 47 and the other of the contacts commonly terminating the other terminals of the heating elements 41 and 42. Finally, the oven regulator 27 comprises a temperature responsive bulb 54 that is operatively associated with the oven 18 and that is connected to the housing thereof by an associated capillary tube 55. It will be understood that when the oven 18 is at a temperature below that set by the temperature dial 49, the oven regulator 27 is operated to actuate the control switch 50 into its closed position; and on the other hand, when the oven 18 is at the temperature set by the temperature dial 49, the oven regulator 27 is operated to actuate the control switch 50 into its open position. Thus in the operation of the oven 18, the oven regulator 27 selectively actuates the control switch 50 to maintain the temperature in the oven 18 to that set by the temperature dial 49, in a conventional manner.

Continuing now with the operation of the oven selector switch 32, assume that the control switch 50 occupies its closed position. When the oven selector switch 32 occupies either its "normal off" or its "timer off" position, the sets of switch springs S37, S38, S39 and S40 occupy their open positions; whereby all of the circuits to the heating elements 41 and 42 are interrupted. When the oven selector switch occupies either tis "normal bake" or its "timer bake" position, the sets of switch springs S37, S38, and S40 occupy their closed positions while the set of switch springs S39 occupies its open position; whereby the upper heating unit 41 is energized across the 115 volts supplied between the neutral conductor 43 and the outside conductor 44, and the lower heating unit 42 is energized across the 230 volts supplied between the outside conductors 44 and 45. When the oven selector switch 32 occupies its "broil" position, the sets of switch springs S37 and S40 occupy their open positions and the sets of switch springs S38 and S39 occupy their closed positions; whereby the upper heating unit 41 is energized across the 230 volts supplied between the outside conductors 44 and 45, and the lower heating unit 42 is deenergized.

Finally, the insulating cams 35 and 36 are provided with coordinately arranged shallow and deep notches therein that maintain the several positions of the oven selector switch 32 and respectively bring about opening and closing of the associated sets of switch springs S37, etc., in a conventional manner.

Further considering the construction of the timer apparatus 11, and referring particularly to Fig. 5, it is noted that also arranged in the casing 29 are front and back supporting plates 56 and 57 secured together in spaced-apart relation, the plate 56 being retained in place by an arrangement including an angle bracket 58 removably secured thereto and carried by the wall of the casing 29. As illustrated, the selector switch 32 also includes an enclosing housing 59 that may be formed of insulating material and suitably secured to the rear of the plate 56. Also, an electric motor 60 of the synchronous type, and preferably a "Telechron" unit, is arranged between the rear wall 31 and the plate 57 and suitably supported upon the plate 57, the motor 60 including the usual elements, as well as a gear box 61 and a forwardly projecting operating shaft 62 extending through an associated hole provided in the plate 57. In the arrangement, the operating shaft 62 is rotated on a time basis at one revolution per hour and comprises the drive motor for the clock mechanism.

Also, the clock mechanism comprises a forwardly projecting bushing 63 secured in a cooperating hole formed in the plate 56 and supporting a minute arbor or shaft 64 interiorly thereof and an hour arbor or sleeve 65 exteriorly thereof, the center line of the minute arbor 64 being aligned with respect to the center line of the operating shaft 62. The front end of the operating shaft 62 and the rear end of the minute arbor 64 are connected together by a friction clutch 66, including cooperating frictionally engaged clutch plates 67 and 68 respectively carried by the operating shaft 62 and by the minute arbor 64; whereby rotation of the operating shaft 62 normally rotates the minute arbor 64, but the minute arbor 64 is rotatable with respect to the operating shaft 62. The extreme front end of the minute arbor 64 carries a manually operable knob 69 disposed somewhat forwardly with respect to the front wall 30 and accommodating ready rotation of the minute arbor 64.

As illustrated in Figs. 2, 4 and 5, the front wall 30 of the casing 29 is provided with an annular depression 70 defining a flange 71 terminating in an annular groove 72 surrounding a circular opening 73 formed therethrough, the elements 70, 71, 72 and 73 being disposed concentric with the minute arbor 64 and spaced well radially therefrom. An outwardly dished disk-like crystal 74, formed of glass, or the like, is arranged in covering relation with the circular opening 73, the rim of the crystal 74 being disposed in the annular groove 72, and the central portion of the crystal 74 having a hole 75 formed therein through which the front end of the minute arbor 64 projects so that the knob 69 is disposed well forwardly of the crystal 74. The crystal 74 is retained in place by an associated annular ring 76 having a rearwardly directed outer flange 77 frictionally engaging the edge of the annular depression 70; whereby the ring 76 constitutes a bezel bearing appropriate time indicia on the front face thereof.

The minute arbor 64 carries a minute hand 78 disposed rearwardly of the crystal 74; and the outer end of the hour arbor 65 carries an hour hand 79 disposed rearwardly of the minute hand 78, the hands 78 and 79 being disposed within the ring 76 and cooperating with the time indicia borne thereby in the usual clock relationship. The rear end of the minute arbor 64 has a pinion 80 secured thereto behind the plate 56; which pinion 80 meshes with a gear 81 carried by a shaft 82 extending between the plates 56 and 57. The front end of the shaft 82 carries a pinion 83 that meshes with a gear 84 carried adjacent to the rear end of the hour arbor 65. In the arrangement, the pinion 80 and the gear 81 bring about a 2:1 speed reduction between the minute arbor 64 and the shaft 82; while the pinion 83 and the gear 84 bring about a 6:1 speed reduction between the shaft 82 and the hour arbor 65. Accordingly, it will be appreciated that clockwise rotation of the operating shaft 62 at one revolution per hour brings about clockwise rotation of the minute arbor 64 at one revolution per hour through the friction clutch 66; whereas clockwise rotation of the minute arbor 64 at one revolution per hour brings about clockwise rotation of the hour arbor 65 at $\frac{1}{12}$ revolution per hour through the gears 80, 81, 83 and 84. Hence the minute hand 78 rotates in the clockwise direction at one revolution per hour and the hour hand 79 rotates in the clockwise direction at $\frac{1}{12}$ revolution per hour; whereby the hands 78 and 79 cooperating with the ring 76 provide the usual clock relationship.

Further, the timer apparatus 11 comprises a front stop dial or disk 85, a rear start dial or disk 86 and a rear start gear 87 rotatably mounted upon the hour arbor 65. More particularly, the central portion of the start disk 86 is rearwardly dished and directly engages the central portion of the start gear 87 disposed rearwardly thereof, the start disk 86 and the start gear 87 being rigidly secured together by a plurality of rivets 88. The stop disk 85 is disposed forwardly of the start disk 86, the spacing therebetween being maintained by an annular collar 89 disposed therebetween and surrounding the hour arbor 65, the stop disk 85 being retained in place by an annular collar 90 disposed on the front side thereof and surrounding the hour arbor 65, and the start gear 87 being retained in place by an annular shoulder 91 formed on the hour arbor 65. In the arrangement, the collar 90 may be rigidly secured to the hour arbor 65 and the collar 89 may be loosely carried thereby. In any case, the stop disk 85 is readily rotatable with respect to the hour arbor 65 independently thereof; and the start disk 86 and the start gear 87 rigidly secured together are readily rotatable together with respect to the hour arbor 65 and independently thereof. Finally, the hour arbor 65 carries an annular fixture 92 disposed rearwardly of the start gear 87 and having a radially projecting arm 93 that cooperates with a rearwardly directed lug or tab 94 bent out of the start gear 87 and cooperating therewith. Also, the front side of the start disk 86 carries a substantially L-shaped lug or tab 95 that projects forwardly into an arcuate slot 96 formed in the stop disk 85 and extending through an angle of 180°, one end of the arcuate slot 96 having an offset recess 97 formed therein and adapted to receive the lug 95.

In view of the foregoing, it will be understood that the start disk 86 has a normal position wherein it is disposed coincident with the hour arbor 65, the arm 93 engaging the lug 94 at this time and rotating the start disk 86 (also the start gear 87) with the hour arbor 65. Similarly, the stop disk 85 has a normal position wherein it is disposed coincident with the start disk 86, the lug 95 engaging the adjacent end of the slot 96 at this time and rotating the stop disk 85 with the start disk 86. Further, the start disk 86 has a variable set position disposed ahead of the hour arbor 65, wherein the start disk 86 is not rotated with the hour arbor 65 when it occupies its set position. Similarly, the stop disk 85 has a variable set position disposed ahead of the start disk 86, wherein the stop disk 85 is not rotated with the start disk 86 when it occupies its set position. For the purpose of correlating the set position of the stop disk 85 with respect to the time ring 76, an index pointer 98 (preferably red) is provided on the stop disk 85 adjacent to one end of the slot 96 formed therethrough; and for the purpose of correlating the set position of the start disk 86 with respect to the stop disk 85 and to the time ring 76, an inner arcuate band 99 (preferably red) and an adjacent outer arcuate scale 100 are provided on the start disk 86 and cooperate with the legend "time to bake" provided on the stop disk 85 adjacent to the index pointer 98, the red band 99 and the scale 100 being visible through the slot 96 provided in the stop disk 85 when the start disk 86 occupies its set position. More particularly the exposed ends of the red band 99 and the scale 100 cooperating with the adjacent end of the slot 96 indicate the baking time interval between the set stop clock time and the set start clock time; the cooperation between the index pointer 98 and the time ring 76 indicates the set stop clock time; and the cooperation between the ends of the red band 99 and the scale 100 and the time ring 76 indicate the set start clock time.

For the purpose of selectively setting the stop disk 85 and the start disk 86, an arrangement is provided that includes a manually operable setting control knob 101 provided on the extreme outer end of a rearwardly projecting shaft 102 mounted for rotation in the plates 56 and 57, the shaft 102 projecting through a notch 103 formed in the right-hand side of the time ring 76 and through an associated hole 104 provided in the front wall 30 adjacent to the depression 70, as shown in Fig. 5. The intermediate portion of the shaft 102 carries a gear 105 that meshes with the teeth provided on the periphery of the start gear 87. Thus, it will be understood that by rotation of the setting knob 101 in either direction, the start gear 87 is rotated in the opposite direction by virtue of the mesh between the teeth provided on the gears 87 and 105. In order to set the stop disk 85 out of its normal position, the setting knob 101 is rotated in the counterclockwise direction effecting rotation of the start gear 87 in the clockwise direction; whereby the start disk 87 is rotated out of its normal position in coincidence with the hour arbor 65. As the start disk 86 is thus rotated in the clockwise direction, the lug 95 engages the adjacent end of the slot 96 provided in the stop disk 85 so that the stop disk 85 is also rotated in the clockwise direction in order that the index pointer 98 may be rotated into any desired cooperation with the time ring 76 thus setting the stop clock time. After thus setting the stop clock time, the start clock time is set by rotating the setting knob 101 in the clockwise direction so as to effect rotation of the start gear 87 in the counterclockwise direction. Counterclockwise rotation of the start gear 87 effects corresponding rotation of the start disk 86 so that the lug 95 disengages the adjacent end of the slot 96 formed in the stop disk 85, whereby the stop disk 85 is left in its set position and the start disk 86 is moved in the counterclockwise direction thereunder so that the stop disk 85 is now out of its normal position and the ends of the red band 99 and the scale 100 are exposed through the adjacent end of the slot 96. More particularly, the start disk 86 is thus rotated in the counterclockwise direction until there is exposed in the adjacent end of the slot 96 the required portions of the red band 99 and the scale 100, setting the start clock time and indicating the clock time interval between the set stop clock time and the set start clock time. At this time, both the start disk 86 and the stop disk 85 are at rest respectively indicating the set start clock time and the set stop clock time.

As time proceeds and at the set start clock time, the hour arbor 65 is again rotated into coincidence with the start disk 86, whereby the start disk 86 again occupies its normal position; and at this time, the arm 93 engages the lug 94 so that the hour arbor 65 picks-up the start gear 87 and the start disk 86 for further rotation therewith. This pick-up of the start disk 86 at the set start clock time effects a switching control, as explained more fully hereinafter. Now as time proceeds, the start disk 86 is rotated toward the stop disk 85 so that at the set stop clock time, the start disk 86 is again rotated into coincidence with the stop disk 85, whereby the lug 95 again engages the adjacent end of the slot 96 provided in the stop disk 85 in its normal position effecting pick-up of the stop disk 85 and further rotation thereof. This pick-up of the stop disk 85 at the set stop clock time effects a switching control, as explained more fully hereinafter. At this time, both the start disk 86 and the stop disk 85 occupy their normal positions, whereby they are both rotated in the clockwise direction with the hour arbor 65, in the manner previously explained.

Considering now the interconnection between the clock mechanism and the oven selector switch 32, it is noted that the stop disk 85 and the start disk 86 in fact comprise gears being respectively provided about the peripheries thereof with the teeth respectively indicated at 106 and 107. A first pinion 108 rotatably mounted on the front end of a shaft 109 carried by the plates 56 and 57 is arranged in meshing relation with the teeth 106 on the stop disk 85 so that the pinion 108 is rotated in the counterclockwise direction when the stop disk 85 is normally rotated in the clockwise direction. Similarly, a second pinion 110 rotatably mounted on the front end of a shaft 111 carried by the plates 56 and 57 is arranged in meshing relation with the teeth 107 on the start disk 86 so that the pinion 110 is rotated in the counterclockwise direction when the start disk 86 is normally rotated in the clockwise direction. Ratchet wheels 112 and 113 are respectively rigidly secured to the pinions 108 and 110 and rotatable therewith, and are arranged in coplaner relationship, in cooperative relation with a common pawl 114 provided on the outer end of an element 115, the inner end of which is connected by a pin 116 to the outer end of an arm 117 that is rotatably and loosely journaled on the operating shaft 33 of the oven selector switch 32.

As illustrated in Fig. 4, the arm 117 (and consequently the element 115) is provided with an intermediate position, shown in full lines, and corresponding to the "timer bake" position of the oven selector switch 32. Also the arm 117 is provided with a normal position shown in dotted lines, and to the left of the intermediate position thereof, and corresponding to the "normal off" position of the oven selector switch 32; as well as a final position, shown in dotted lines, to the right of the intermediate position thereof, and corresponding to the "timer off" position of the oven selector switch 32. The arm 117 is biased in the counterclockwise direction into its normal position by an arrangement including a coil spring 118 surrounding the operating shaft 33 and extending between a projection 119 carried by the front of the plate 56 and a slot 120 provided in the right-hand side of the arm 117. The normal position of the arm 117 is established by an associated forwardly extending stop 121 carried by the front of the plate 56; and the final position of the arm 117 is established by an associated forwardly extending stop 122 carried by the front of the plate 56. Thus it will be understood that the arm 117 is rotatable in the clockwise direction from its normal position established by the stop 121 through its intermediate position into its final position established by the stop 122 against the bias of the spring 118; and of course, the element 115 is movable with the arm 117 as a consequence of the connection therebetween, including the pin 116, the element 115 having a notch 123 formed in the lower edge thereof so as to prevent interference with the stop 121 when the arm 117 occupies its final position. Finally, a collar 124 is rigidly secured to the operating shaft 33 rearwardly of the arm 117 and provided with a forwardly projecting tab or lug 125 bent out of the body thereof and cooperating with the left-hand side of the arm 117. Thus, it will be understood that when the operating shaft 33 is rotated in the clockwise direction from its "normal off" position, the collar 124 carried thereby causes the lug 125 to engage the left-hand side of the arm 117 rotating the arm 117 in the clockwise direction therewith, for a purpose more fully explained hereinafter.

The element 115 is biased downwardly by an arrangement including a coil spring 126 extending between a hole 127 formed in the intermediate portion of the element 115 and a cooperating forwardly projecting pin 128 carried by the front side of the plate 56. When the arm 117 occupies its normal position, the element 115 is projected upwardly and to the left so that the pawl 114 is disposed well above the ratchet wheel 112 and so that a lower forwardly disposed guide portion 129 of the element 115 rides up upon a forwardly projecting guide pin 130 carried by the front of the plate 56. When the arm 117 occupies its intermediate position, the element 115 is projected upwardly and to the left so that the pawl 114 directly engages and is latched upon the ratchet wheel 112. When the arm 117 occupies its final position, the element 115 is projected upwardly and to the left so that the pawl 114 directly engages and is latched upon the ratchet wheel 113. Further, a forwardly projecting stop pin 131 is carried by the front of the plate 56 and arranged to engage the element 115 when the arm 117 occupies its final position so as to prevent the pawl 114 from falling below and out of cooperating relation with respect to the ratchet wheel 113. Finally, a radially projecting pin 132 is carried by the collar 124 and arranged in cooperating relation with the stop 122 to prevent rotation of the operating shaft 33 in the counterclockwise direction beyond the "broil" position of the oven selector switch 32.

In view of the foregoing, it will be understood that the ratchet wheel 113 and the cooperating pawl 114 comprise a first latch mechanism that is set when rotation of the start disk 86 is arrested to stop rotation of the ratchet wheel 113. Similarly the ratchet wheel 112 and the cooperating pawl 114 comprise a second latch mechanism that is set when rotation of the stop disk 85 is arrested to stop rotation of the ratchet wheel 112. After setting of the first and second latch mechanisms, the oven selector switch 32 is set from its "normal off" position into its "timer off" position, whereby the arm 117 is rotated from its normal position through its intermediate position into its final position against the bias of the spring 118 so that the pawl 114 engages and is latched upon the stationary ratchet wheel 113. Subsequently when rotation of the start disk 86 is initiated, the ratchet wheel 113 is rotated slightly in the counterclockwise direction so that the pawl 114 disengages the teeth thereon causing the guide portion 129 of the element 115 to ride over the ratchet wheel 113 so that the pawl 114 is moved into engagement and in latched relation with the ratchet wheel 112, the arm 117 being returned from its final position back into its intermediate position by the spring 118. Still subsequently when rotation of the stop disk 85 is initiated, the ratchet wheel 112 is rotated slightly in the counterclockwise direction so that the pawl 114 disengages the teeth thereon causing the guide portion 129 of the element 115 to ride over the ratchet wheel 112 so that the guide portion 129 thereof rides upon the pin 130 moving the element 115 from engagement with the ratchet wheel 112, the arm 117 being returned from its intermediate position back into its normal position by the spring 118.

Considering now the overall operation of the timer apparatus 11 to control an automatic cooking operation in the oven 18, the manually operable setting knob 101 is manipulated in the manner previously explained so as to effect setting of the stop disk 85 into a desired stop clock time and to effect setting of the start disk 86 into a desired start clock time, the disks 85 and 86 being sequentially set out of their normal positions so as to effect arresting of the rotation of the ratchet wheels 112 and 113 and the consequent setting of the first and second latch mechanisms in the manner previously explained. The manually operable switch knob 34 is then rotated in the clockwise direction to operate the oven selector switch 32 from its "normal off" position through its "timer bake" position into its "timer off" position so that the collar 124 moves the arm 117 from its normal position through its intermediate position into its final position against the bias of the spring 118; whereby the arm 117 is restrained in its final position by the ratchet wheel 113 of the first latch mechanism in its set position.

Thereafter and at the set start clock time, rotation of the start disk 86 is again initiated; whereby the slight rotation of the ratchet wheel 113 in the counterclockwise direction releases the first latch mechanism so that the pawl 114 is moved into latched relation with respect to the ratchet wheel 112 of the second latch mechanism, in order that the arm 117 is moved from its final position back into its intermediate position by the spring 118. This movement of the arm 117 from its final position back into its intermediate position operates the oven selector switch 32 from its "timer off" position into its "timer on" position by virtue of the cooperation between the arm 117 and the lug 125 carried by the collar 124. Thereafter and at the set stop clock time, rotation of the stop disk 85 is again initiated; whereby the slight rotation of the ratchet wheel 112 in the counterclockwise direction releases the second latch mechanism in order that the arm 117 is moved from its intermediate position back into its normal position by the spring 118. This movement of the arm 117 from its intermediate position back into its normal position operates the oven selector switch 32 from its "timer bake" position into its "normal off" position by virtue of the cooperation between the arm 117 and the lug 125 carried by the collar 124.

At this time the automatic cooking operation in the oven 18 is concluded and since the oven selector switch 32 occupies its "normal off" position, a subsequent manual control of a cooking operation in the oven 18 may be initiated merely by operating the oven selector switch 32 into the required control position employing the manual knob 34 and without reference to the prior automatic cooking operation that was carried out by the timer apparatus 11, as described above. Moreover at the conclusion of the automatic cooking operation, the start disk 86 and the stop disk 85 are continuously rotated with the hour arbor 65 so that the previously set start and stop clock times have been completely wiped out or erased from the timer apparatus 11. The two last-mentioned features of the timer apparatus 11 are very advantageous in view of the fact that no manipulation of the timer apparatus 11 is required to condition the oven selector switch 32 for subsequent manual operation and since the erasure of the previously used start and stop clock times prevents any possibility of confusion the next time the operator wishes to carry out another automatic cooking operation in the oven 18 employing different start and stop clock times.

Recapitulating, it will be appreciated that the connection between the arm 117 and the collar 124 is a one-way drive connection, whereby the operator at any time may manipulate the manual knob 34 in order appropriately and correspondingly to set the oven selector switch 32 and regardless of the set or unset position of the timer apparatus 11. This arrangement is very advantageous as the operator at any time, even after setting the timer apparatus 11, may decide to carry-out a normal bake operation or a broil operation in the oven 18 and may accordingly appropriately manipulate the manual knob 34 to bring about the required setting of the oven selector switch 32. In this case, the previously set timer apparatus 11 operates through its timed controls, in the manner described, but without effect, since the arm 117 loosely mounted upon the operating shaft 33 in its movements does not engage the lug 125 as the lug 125 carried by the collar 124 occupies a position to the left beyond the movements of the arm 117, as illustrated in Fig. 4. In other words, when the selector switch 32 occupies either its "normal bake" position or its "broil" position, the lug 125 occupies a position to the left beyond the limit of cooperation with the arm 117, as established by the stop pin 121, so that movements of the arm 121 under the control of the timer apparatus 11 are without effect.

Also, it will be understood that in the event the operator should wish immediately to initiate a cooking operation but desires the timer apparatus 11 to arrest the cooking operation subsequently, this may be accomplished in a ready manner merely by manipulating the setting control knob 101 to establish a stop clock time followed by operation of the manual knob 34 to move the oven selector switch 32 into its "timer bake" position. In this case, the cooking operation in the oven 18 proceeds immediately, and subsequently at the set stop clock time, rotation of the stop disk 85 is initiated to bring about the release of the ratchet wheel 112 of the second latch mechanism so that the arm 117 is moved from its intermediate position back into its normal position effecting operation of the oven selector switch 32 from its "timer bake" position into its "normal off" position.

Further, it is pointed out that the "wipe-out" arrangement of the set start and stop clock times following the automatic operation is further advantageous in that it renders the timer apparatus 11 under normal conditions more nearly similar to an ordinary kitchen clock without the presentation of the various times that might have been employed in conjunction with a prior automatic cooking operation. This causes the timer apparatus 11 to be simple and very attractive as a kitchen clock. Moreover, the arrangement of the manual control knob 34 of the oven selector switch 32 closely adjacent to the manually operable timer setting knob 101 is very advantageous as it facilitates sequential operation of these two manually operable control knobs and serves to remind the operator that these two control knobs must be sequentially manipulated in order to bring about an automatic cooking operation in the oven 18. In other words, the complete removal of the manual control knob 34 of the oven selector switch 32 from the remainder of the manual control knobs 23, etc., upon the backsplash 22 and the close association of the manual control knob 34 with the manual control knob 101 reduce the errors of the operator and greatly facilitate control of cooking operations in the oven 18.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a control switch having an off position and a normal on position and a timer on position, a movable element having a normal position and an operated position, a single manually operable member for selectively operating said switch into any one of its positions independently of the position of said element and at the will of the operator, a spring biasing said element into its normal position, means responsive to operation of said switch from its off position into its timer on position for moving said element against the bias of said spring from its normal position into its operated position, latch mechanism for restraining said element in its operated position, said spring returning said element from its operated position back into its normal position in response to the release of said latch mechanism, means responsive to movement of said element from its operated position back into its normal position for operating said switch into its off position only in the event said switch occupies its timer on position, clock mechanism, indicator mechanism controlled by said clock mechanism for releasing said latch mechanism at a set clock time, and manually operable means for selectively setting said indicator mechanism to any desired clock time.

2. The combination set forth in claim 1, wherein said switch is of the rotary snap type, said normal on position and said timer on position are respectively disposed on opposite sides of said off position, and said manually operable member is in the form of a rotatable knob.

3. In combination, a control switch having an off position and a normal on position and a timer on position, a movable element having a normal position and an operated position, a single manually operable member for selectively operating said switch into any one of its positions independently of the position of said element and at the will of the operator, a spring biasing said element into its normal position, means responsive to operation of said switch from its off position into its timer on position for moving said element against the bias of said spring from its normal position into its operated position, latch mechanism cooperating with said element and having a set position and a release position, said latch mechanism in its set position restraining said element in its operated position, said spring returning said element from its operated position back into its normal position in response to operation of said latch mechanism into its release position, means responsive to movement of said element from its operated position back into its normal position for operating said switch into its off position only in the event said switch occupies its timer on position, clock mechanism, indicator mechanism controlled by said clock mechanism and having a normal position and a variable set position, manually operable means for selectively moving said indicator mechanism from its normal position into its set position corresponding to any desired clock time, means including said clock mechanism for returning said indicator mechanism from its set position back into its normal position at said set clock time, and means responsive to movement of said indicator mechanism out of its normal position for operating said latch mechanism into its set position and responsive to movement of said indicator mechanism back into its normal position for operating said latch mechanism into its release position.

4. In combination, a control switch having a normal off position and a timer off position and a normal on position and a timer on position, a movable element having a normal position and an intermediate position and a final position, a single manually operable member for selectively operating said switch into any one of its positions independently of the position of said element and at the will of the operator, a spring biasing said element into its normal position, means responsive to operation of said switch from its normal off position into its timer off position for moving said element against the bias of said spring from its normal position through its intermediate position into its final position, first latch mechanism for restraining said element in its final position, second latch mechanism for restraining said element in its intermediate position, said spring returning said element from its final position back into its intermediate position in response to the release of said first latch mechanism and returning said element from its intermediate position back into its normal position in response to the release of said second latch mechanism, means responsive to movement of said element from its final position back into its intermediate position for operating said switch into its timer on position only in the event said switch occupies its timer off position and responsive to movement of said element from its intermediate position back into its normal position for operating said switch into its normal off position only in the event said switch occupies its timer on position, clock mechanism, first indicator mechanism controlled by said clock mechanism for releasing said first latch mechanism at a set start clock time, second indicator mechanism controlled by said clock mechanism for releasing said second latch mechanism at a set stop clock time, and manually operable means for selectively setting said first indicator mechanism to any desired start clock time and for selectively setting said second indicator mechanism to any desired stop clock time.

5. The combination set forth in claim 4, wherein said switch is of the rotary snap type, said normal off position is disposed intermediate said normal on position and said timer on position, said timer on position is disposed intermediate said normal off position and said timer off position, and said manually operable member is in the form of a rotatable knob.

6. In combination, a control switch having a normal off position and a timer off position and a normal on position and a timer on position, a movable element having a normal position and an intermediate position and a final position, a single manually operable member for selectively operating said switch into any one of its positions independently of the position of said element and at the will of the operator, a spring biasing said element into its normal position, means responsive to operation of said switch from its normal off position into its timer off position for moving said element against the bias of said spring from its normal position through its intermediate position into its final position, first latch mechanism cooperating with said element and having a set position and a release position, said first latch mechanism in its set position restraining said element in its final position when it is moved thereinto, second latch mechanism cooperating with said element and having a set position and a release position, said second latch mechanism in its set position restraining said element in its intermediate position when it is moved thereinto, said spring returning said element from its final position back into its intermediate position in response to operation of said first latch mechanism into its release position and returning said element from its intermediate position back into its normal position in response to operation of said second latch mechanism into its release position, means responsive to movement of said element from its final position back into its intermediate position for operating said switch into its timer on position only in the event said switch occupies its timer off position and responsive to movement of said element from its intermediate position back into its normal position for operating said switch into its normal off position only in the event said switch occupies its timer on position, clock mechanism, first indicator mechanism controlled by said clock mechanism and having a normal position and a variable set position, second indicator mechanism controlled by said clock mechanism and having a normal position and a variable set position, manually operable means for selectively moving said first indicator mechanism from its normal position into its set position corresponding to any desired start clock time and for selectively moving said second indicator mechanism from its normal position into its set position corresponding to any desired stop clock time, means including said clock mechanism for returning said first indicator mechanism from its set position back into its normal position at said set start clock time and for returning said second indicator mechanism from its set position back into its normal position at said set stop clock time, means responsive to movement of said first indicator mechanism out of its normal position for operating said first latch mechanism into its set position and responsive to movement of said first indicator mechanism back into its normal position for operating said first latch mechanism into its release position, and means responsive to movement of said second indicator mechanism out of its normal position for operating said second latch mechanism into its set position and responsive to movement of said second indicator mechanism back into its normal position for operating said second latch mechanism into its release position.

7. In combination, clock mechanism including a rotatable time arbor, a rotatably mounted start disk having a normal position coincident with said arbor and a variable set position disposed ahead of said arbor, said start disk being rotated by said arbor only when said start disk is in its normal position, a rotatably mounted stop disk having a normal position coincident with said start disk and a variable set position disposed ahead of said start disk, said stop disk being rotated by said start disk only when said stop disk is in its normal position, manually operable means for selectively setting said start disk out of its normal position into its set position corresponding to any desired start clock time and for selectively setting said stop disk out of its normal position into its set position corresponding to any desired stop clock time, a device having a plurality of control positions, means responsive to subsequent rotation of said arbor into coincidence with said start disk at said set start clock time for operating said device into a first of its control positions, and means responsive to subsequent rotation of said start disk into coincidence with said stop disk at said set stop clock time for operating said device into a second of its control positions.

8. In combination, clock mechanism including a rotatable time arbor, a rotatably mounted start disk having a normal position coincident with said arbor and a variable set position disposed ahead of said arbor, said start disk being rotated by said arbor only when said start disk is in its normal position, a rotatably mounted stop disk having a normal position coincident with said start disk and a variable set position disposed ahead of said start disk, said stop disk being rotated by said start disk only when said stop disk is in its normal position, manually operable means for selectively setting said start disk out of its normal position into its set position corresponding to any desired start clock time and for selectively setting said stop disk out of its normal position into its set position corresponding to any desired stop clock time, a control switch having a first off position and a second off position and an on position, manually operable means for operating said switch from its first off position into its second off position, means responsive to subsequent rotation of said arbor into coincidence with said start disk at set start time for operating said switch from its second off position into its on position, and means responsive to subsequent rotation of said start disk into coincidence with said stop disk at said set stop clock time for operating said device from its on position back into its first off position.

9. In combination, clock mechanism including a rotatable time arbor, a rotatably mounted start disk having a normal position coincident with said arbor and a variable set position disposed ahead of said arbor, said start disk being rotated by said arbor only when said start disk is in its normal position, a rotatably mounted stop disk having a normal position coincident with said start disk and a variable set position disposed ahead of said start disk, said stop disk being rotated by said start disk only when said stop disk is in its normal position, manually operable means for selectively setting said start disk out of its normal position into its set position corresponding to any desired start clock time and for selectively setting said stop disk out of its normal position into its set position corresponding to any desired stop clock time, said stop disk being disposed in covering relation with said start disk and having a cut-out therein cooperating with a time index provided on said start disk, a portion of said time index being exposed through said cut-out only when said start disk is out of coincidence with said stop disk, the initial exposed portion of said index when both said start disk and said stop disk occupy their set positions corresponding to the total clock time interval between said start clock time and said stop clock time and the subsequent exposed portion of said index when said start disk occupies its normal position and said stop disk occupies its set position corresponding to the unelapsed portion of said total clock time interval, a device having a plurality of control positions, means responsive to subsequent rotation of said arbor into coincidence with said start disk at said set start clock time for operating said device into a first of its control positions, and means responsive to subsequent rotation of said start disk into coincidence with said stop disk at said set stop clock time for operating said device into a second of its control positions.

10. The combination set forth in claim 9, and further comprising a stationary clock index cooperating with said stop disk and indicating said stop clock time when said stop disk occupies its set position.

11. In combination, clock mechanism including a rotatable time arbor, a rotatably mounted start disk having a normal position coincident with said arbor and a variable set position disposed ahead of said arbor, said start disk being rotated by said arbor only when said start disk is in its normal position, a rotatably mounted stop disk having a normal position coincident with said start disk and a variable set position disposed ahead of said start disk, said stop disk being rotated by said start disk only when said stop disk is in its normal position, a single manually operable member for selectively rotating said start disk in either direction, rotation of said start disk in the clockwise direction rotating said start disk out of its normal position and causing said start disk to rotate said stop disk therewith to accommodate rotation of said stop disk into any desired set position, subsequent rotation of said start disk in the counterclockwise direction being independent of said stop disk so as to leave said stop disk out of its normal position and to accommodate rotation of said start disk into any desired set position, a device having a plurality of control positions, means responsive to subsequent rotation of said armor into coincidence with said start disk at said set start clock time for operating said device into a first of its control positions, and means responsive to subsequent rotation of said start disk into coincidence with said stop disk at said set stop clock time for operating said device with a second of its control positions.

12. In combination, clock mechanism including a rotatable time arbor, a rotatably mounted start disk having a normal position coincident with said arbor and a variable set position disposed ahead of said arbor, said start disk being rotated by said arbor only when said start disk is in its normal position, a rotatably mounted stop disk having a normal position coincident with said start disk and a variable set position disposed ahead of said start disk, said stop disk being rotated by said start disk only when said stop disk is in its normal position, manually operable means for selectively setting said start disk out of its normal position into its set position corresponding to any desired start clock time and for selectively setting said stop disk out of its normal position into its set position corresponding to any desired stop clock time, said arbor picking-up said start disk and again rotating it therewith when said arbor is rotated into coincidence therewith at said set start clock time, said start disk picking-up said stop disk and again rotating it therewith when said start disk is rotated into coincidence therewith at said set stop clock time, a device having a plurality of control positions, means responsive to rotation of said start disk following arresting of rotation thereof for operating said device into a first of its control positions, and means responsive to rotation of said stop disk following arresting of rotation thereof for operating said device into a second of its control positions.

13. In combination, clock mechanism including a rotatable time arbor, a rotatably mounted start disk having a normal position coincident with said arbor and a variable set position disposed ahead of said arbor, said start disk being rotated by said arbor only when said start disk is in its normal position, a rotatably mounted stop disk having a normal position coincident with said start disk and a variable set position disposed ahead of said start disk, said stop disk being rotated by said start disk only when said stop disk is in its normal position, manually operable means for selectively setting said start disk out of its normal position into its set position corresponding to any desired start clock time and for selectively setting said stop disk out of its normal position into its set position corresponding to any desired stop clock time, said arbor picking-up said start disk and again rotating it therewith when said arbor is rotated into coincidence therewith at said set start clock time, said start disk picking-up said stop disk and again rotating it therewith when said start disk is rotated into coincidence therewith at said set stop clock time, first latch mechanism cooperating with said start disk and set in response to arresting of rotation thereof and released in response to continued rotation thereof, second latch mechanism cooperating with said stop disk and set in response to arresting of rotation thereof and released in response to continued rotation thereof, a control device having first and second and third positions, means governed when said first latch mechanism is set for restraining said control device in its first position, means responsive to the release of said first latch mechanism for moving said control device from its first position into its second position, means governed when said second latch mechanism is set for restraining said control device in its second position, and means responsive to the release of said second latch mechanism for moving said control device from its second position into its third position.

14. The combination set forth in claim 13, wherein said first latch mechanism includes a first ratchet member driven by said start disk, said second latch mechanism includes a second ratchet member driven by said stop disk, and said first and second latch mechanisms include a common pawl member successively cooperating with said first and second ratchet members.

15. In combination, clock mechanism including a rotatable time arbor, a rotatably mounted start disk having a normal position coincident with said arbor and a variable set position disposed ahead of said arbor, said start disk being rotated by said arbor only when said start disk is in its normal position, a rotatably mounted stop disk having a normal position coincident with said start disk and a variable set position disposed ahead of said start disk, said stop disk being rotated by said start disk only when said stop disk is in its normal position, manually operable means for selectively setting said start disk out of its normal position into its set position corresponding to any desired start clock time and for selectively setting said stop disk out of its normal position into its set position corresponding to any desired stop clock time, said arbor picking-up said start disk and again rotating it therewith when said arbor is rotated in coincidence therewith at said set start clock time, said start disk picking-up said stop disk and again rotating it therewith when said start disk is rotated into coincidence therewith at said set stop clock time, said start disk having teeth thereon, a first pinion meshing with the teeth on said start disk, said stop disk having teeth thereon, a second pinion meshing with the teeth on said stop disk, a device having a plurality of control positions, and means successively controlled by said first and second pinions for successively operating said device between different ones of its control positions.

16. In combination, clock mechanism including concentric rotatable minute an hour arbors respectively carrying minute and hour hands, a surrounding ring cooperating with said minute and hour hands and provided with a cooperating time index, a rear start disk mounted for rotation concentric with said hour arbor within said ring and having a normal position coincident with said hour arbor and a variable set position disposed ahead of said hour arbor, a drive connection between said hour arbor and said start disk that is engaged only when said start disk occupies its normal position, whereby said start disk is rotated with said hour arbor only when it occupies its normal position, a front stop disk mounted for rotation concentric with said hour arbor within said ring and having a normal position coincident with said start disk and a variable set position disposed ahead of said start disk, a drive connection between said start disk and said stop disk that is engaged only when said stop disk occupies its normal position, whereby said stop disk is rotated with said start disk only when it occupies its normal position, manually operable means for selectively setting said start disk out of its normal position into its set position corresponding to any desired start clock time and for selectively setting said stop disk out of its normal position into its set position corresponding to any desired stop clock time, the set position of said start disk with respect to said ring indicating said set start clock time and the set position of said stop disk with respect to said ring indicating said set stop clock time and the relative positions of said disks with respect to each other indicating the clock time interval between said start clock time and said stop clock time, and a device operated into a first position under the control of said start disk at said start clock time and operated into a second position under the control of said stop disk at said stop clock time.

17. The combination set forth in claim 16, wherein said stop disk is provided with a cut-out therein and said start disk is provided with a cooperating scale that is exposed though said cut-out only when said stop disk is out of its normal position, rotation of said start disk with said hour arbor when it occupies its normal position gradually removing said scale from its exposed position through said cut-out until finally said scale is concealed by said stop disk when said stop disk occupies its normal position, the exposed position of said scale indicating the unelapsed portion of said clock time interval.

18. In combination, clock mechanism including concentric rotatable minute and hour arbors respectively carrying minute and hour hands, a surrounding ring cooperating with said minute and hour hands and provided with a cooperating time index, a rear start disk mounted for rotation concentric with said hour arbor within said ring and having a normal position coincident with said hour arbor and a variable set position disposed ahead of said hour arbor, a drive connection between said hour arbor and said start disk that is engaged only when said stark disk occupies its normal position, whereby said start disk is rotated with said hour arbor only when it occupies its normal position, a front stop disk mounted for rotation concentric with said hour arbor within said ring and having a normal position coincident with said start disk and a variable set position disposed ahead of said start disk, a drive connection between said start disk and said stop disk that is engaged only when said stop disk occupies its normal position, whereby said stop disk is rotated with said start disk only when it occupies its normal position, manually operable means for rotating said start disk in either direction, whereby rotation of said start disk in the clockwise direction rotates said start disk out of its normal position and rotates said stop disk therewith and moves said stop disk into any desired set position and subsequent rotation of said start disk in the counterclockwise direction is independent of said stop disk and leaves said stop disk out of its normal position and moves said start disk into any desired set position, the set position of said start disk with respect to said ring indicating said set start clock time and the set position of said stop disk with respect to said ring indicating said set stop clock time and the relative positions of said disks with respect to each other indicating the clock time interval between said start clock time and said stop clock time, and a device operated into a first position under the control of said start disk at said start clock time and operated into a second position under the control of said stop disk at said stop clock time.

19. The combination set forth in claim 18, wherein said manually operable means includes a knob carried by a rotatably mounted shaft, a pinion carried by said shaft, and a gear carried by said start disk and meshing with said pinion.

20. The combination set forth in claim 16, wherein said minute arbor is in the form of a centrally disposed shaft, said hour arbor is in the form of a sleeve surrounding said shaft, and said start disk and said stop disk are both mounted and supported upon said sleeve and rotatable independently thereof.

21. In an electric heating system including an oven provided with electric heating units, and an oven control switch having an off position and a broil position and a normal bake position and a timer bake position, said switch in its off position deenergizing said heating units, said switch in its broil position selectively energizing said heating units to establish a broiling condition in said oven, said switch in either its normal bake position or its timer bake position selectively energizing said heating units to establish a baking condition in said oven; the combination comprising a movable element having a normal position and an operated position, a single manually operable member for selectively operating said switch into any one of its positions independently of the position of said element and at the will of the operator, a spring biasing said element into its normal position, means responsive to operation of said switch from its off position into its timer bake position for moving said element against the bias of said spring from its normal position into its operated position, latch mechanism for restraining said element in its operated position, said spring returning said element from its operated position back into its normal position in response to the release of said latch mechanism, means responsive to movement of said element from its operated position back into its normal position for operating said switch into its off position only in the event said switch occupies its timer bake position, clock mechanism, indicator mechanism controlled by said clock mechanism for releasing said latch mechanism at a set clock time, and manually operable means for selectively setting said indicator mechanism to any desired clock time.

22. In an electric heating system including an oven provided with electric heating units, an oven control switch having a normal off position and a timer off position and a broil position and a normal bake position and timer bake position, said switch in either its normal off position or its timer off position deenergizing said heating units, said switch in its broil position selectively energizing said heating units to establish a broiling condition in said oven, said switch in either its normal bake position or its timer bake position selectively energizing said heating units to establish a baking condition in said oven; the combination comprising a movable element having a normal position and an intermediate position and a final position, a single manually operable member for selectively operating said switch into any one of its positions independently of the position of said element and at the will of the operator, a spring biasing said element into its normal position, means responsive to operation of said switch from its normal off position into its timer off position for moving said element against the bias of said spring from its normal position through its intermediate position into its final position, first latch mechanism for restraining said element in its final position, second latch mechanism for restraining said element in its intermediate position, said spring returning said element from its final position back into its intermediate position in response to the release of said first latch mechanism and returning said element from its intermediate position back into its normal position in response to the release of said second latch mechanism, means responsive to movement of said element from its final position back into its intermediate position for operating said switch into its timer bake position only in the event said switch occupies its timer off position and responsive to movement of said element from its intermediate position back into its normal position for operating said switch into its normal off position only in the event said switch occupies its timer bake position, clock mechanism, first indicator mechanism controlled by said clock mechanism for releasing said first latch mechanism at a set start clock time, second indicator mechanism controlled by said clock mechanism for releasing said second latch mechanism at a set stop clock time, and manually operable means for selectively setting said first indicator mechanism to any desired start clock time and for selectively setting said second indicator mechanism to any desired stop clock time.

DOUGLAS F. ILLIAN.
NORMAN T. TERP.

References Cited in the file of this patent

UNITED STATES PATENTS

| Number | Name | Date |
|---|---|---|
| 1,758,619 | Phillip | May 13, 1930 |
| 2,200,110 | Andersen | May 7, 1940 |
| 2,638,979 | Harris | May 19, 1953 |